United States Patent [19]

Van Venrooy

[11] 3,761,530

[45] Sept. 25, 1973

[54] PREPARATION OF POLYCYCLIC AROMATIC COMPOUNDS

[75] Inventor: John J. Van Venrooy, Media, Pa.

[73] Assignee: Sun Research and Development Co., Philadelphia, Pa.

[22] Filed: May 31, 1972

[21] Appl. No.: 258,282

[52] U.S. Cl............................ 260/668 F, 260/668 R
[51] Int. Cl.............................................. C07c 15/24
[58] Field of Search..................... 260/668 R, 668 F

[56] References Cited
UNITED STATES PATENTS

| | | | |
|---|---|---|---|
| 3,379,768 | 4/1968 | Corson et al..................... | 260/668 R |
| 3,466,333 | 9/1969 | Bruson et al...................... | 260/668 F |
| 3,636,157 | 1/1972 | Bozik et al....................... | 260/668 R |

FOREIGN PATENTS OR APPLICATIONS 1,206,903   9/1970   Great Britain

Primary Examiner—Curtis R. Davis
Attorney—George L. Church et al.

[57] ABSTRACT

A method for the preparation of 1,3-dimethyl substituted polycyclic aromatic compounds which comprises (1) subjecting a compound of structure

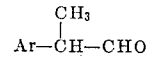

where Ar is an aromatic or substituted aromatic group, to a mixed aldol condensation with propionaldehyde to form a 4-Ar-2-methyl-2-pentenal; and (2) subjecting said pentenal to a ring closure catalyzed by a halogen acid.

5 Claims, No Drawings

PREPARATION OF POLYCYCLIC AROMATIC COMPOUNDS

A wide variety of dimethyl substituted polycyclic aromatics are available in large quantity in petroleum refinery streams and coke oven condensates. However, their separation and purification has proven to be very expensive due to the complex nature of these mixtures. Other synthetic routes to specific compounds are either very circuitous or require the use of rare and unusual starting materials. These dimethyl substituted polycyclic aromatic compounds are useful intermediates for the preparation of dicarboxylic acids, which, in turn, are of value as polyester intermediates.

It has now been found that the formation of 1,3-dimethyl substituted polycyclic aromatic compounds may be prepared in high yields and with good selectivity by a two-step process involving readily available starting materials and reactions which require only simple, easily conducted processing steps in low cost, conventional equipment.

In accord with the invention, 1,3-dimethyl substituted polycyclic aromatic compounds are obtained by (1) subjecting a compound of structure

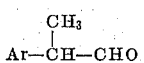

where Ar is an aromatic or substituted aromatic group to a mixed aldol condensation with propionaldehyde to form a 4-Ar-2-methyl-2-pentenal, and (2) subjecting said pentenal to a ring closure catalyzed by a halogen acid. Chemical equations illustrating the process are as follows:

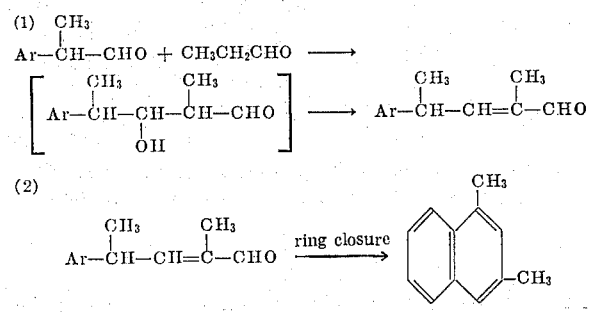

The chemical structure enclosed in brackets is not isolated but is believed to be the intermediate preceding the formation of the 4-Ar-2-methyl-2-pentenal.

It is unexpected that the process of the invention results in such high yields of the desired product because mixed aldol condensations are known to give a variety of products, particularly where the reactant aldehdyes initially contain sufficient hydrogen atoms located alpha to the carbonyl groups to support multiple condensation reactions leading to higher molecular weight materials of a resinous nature. It is also surprising that the process is operable only with propionaldehyde since it has been found by experiment that lower aldehydes, e.g., acetaldehyde, do not lead to the polycyclic product.

The starting aldehydes are, as indicated above, propionaldehyde and an aromatic aldehyde of structure

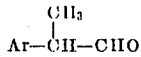

where Ar is an aromatic or alkyl substituted aromatic group. These aromatic aldehydes are readily available from the hydroformylation of vinyl substituted aromatic compounds such as styrene, vinyl naphthalene, and the alkyl substituted styrenes, vinyl naphthalenes, and the like. Examples of preferred aromatic aldehydes of the above structure are those where Ar is a hydrocarbon such as a benzene or naphthalene radical which may be unsubstituted or containing lower alkyl groups. Specific examples of useful aromatic compounds include those where Ar is phenyl, tolyl, xylyl, ethyl phenyl, butyl phenyl, naphthyl, methyl naphthyl, ethyl naphthyl, and the like. It will be understood, of course, that the position on the aromatic ring ortho to the -CH(CH₃)CHO group must be unsubstituted in order for ring closure to occur. The aromatic aldehyde may, of course, be substituted (other than ortho) with groups inert to the reaction such as halogen, nitro, perfluoralkyl, and the like. Thus the operable aromatic aldehydes will have the structure

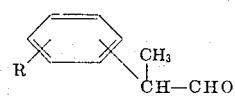

where R is lower alkyl or other inert substituent as set out above, with the proviso that at least one position ortho to the propional group is unsubstituted.

The first step of the reaction is carried out in the usual manner of aldol condensations using a base catalyzed reaction medium. Although dilute sodium hydroxide (about 1 to 5 percent by weight of the reaction mass) is preferred, other conventional aldol catalysts may also be used (e.g., alkali carbonates, bicarbonates, alcoholates, acetates, etc.). The aldehyde reagents, water, and catalyst are simply refluxed for a short time (e.g., about 0.5 to about 5 hours). As indicated in the above chemical equations for the process, the hydroxy substituted condensation product intermediate proceeds directly without further treatment to the pentenal product, which product may be isolated from the reaction mass by conventional means such as ether extraction and removal of the ether solvent. However, in a preferred alternative procedure, the ring closure step may be carried out without isolation of the pentenal.

In the second step of the process the 4-Ar-2-methyl-2-pentenal is cyclized and this is done under acid conditions using a halogen acid, preferably hydrochloric acid or hydrobromic acid. The pentenal and dilute acid (about 1 wt percent concentration) is simply heated at about 150° to 250°C for about 1 to 3 hours with vigorous agitation. The reaction mass is then cooled and the product polycyclic 1,3-dimethyl substituted aromatic hydrocarbon isolated and this is readily accomplished by an ether extraction followed by removal of ether.

In order to further illustrate the invention, the following examples are given:

EXAMPLE 1

A mixture of 20 g hydratropaldehyde [C₆H₅CH(CH₃)CHO], 8.8 g propionaldehyde, 150 g of water, and 5 g of sodium hydroxide is refluxed for 3 hours. The reaction mass is extracted with ether and after evaporating the ether extract a crude 4-phenyl-2-methyl-2-pentenal is obtained in 76 percent yield. This pentenal exists in two structural configurations and NMR analysis shows that the trans isomer is formed in major amount.

EXAMPLE 2

Ten grams of 4-phenyl-2-methyl-2-pentenal is charged to a stirred autoclave containing 100 gms of water and 2.3 g of 38 wt percent hydrochloric acid. The mixture is heated at 200°C for 2 hours with vigorous stirring under autogenous pressure. After cooling, the crude reaction mixture is extracted with ether and after evaporating the ether extract a crude 1,3-dimethylnaphthalene is obtained in 85 percent yield. VPC analysis confirms the product as 1,3-dimethylnaphthalene.

When the above example is repeated using HBr instead of HCl, essentially the same results are obtained.

EXAMPLE 3

A mixture of 34 g of phenylacetaldehyde ($C_6H_5CH_2CHO$), 15 gms of propionaldehyde, 300 g of water and 5 g of sodium hydroxide is refluxed for 3 hours. The reaction mass is extracted with ether and after evaporating the ether extract 38.0 g of a very viscous orange colored resin is obtained. This material has an average molecular weight of 330 indicating that further condensation had taken place. Thus the use of an aromatic aldehyde having two $\alpha$-hydrogens instead of a methyl group is not useful in the process of the invention.

EXAMPLE 4

Twenty grams of hydratropaldehyde is charged to a stirred autoclave containing 100 g of water, 5 g of NaOH and 8.8 g of propionaldehyde. The mixture is heated at 98°C for two hours. The reaction mixture is cooled to room temperature and 10 ml of concentrated HCl is then added to the reaction mixture to bring the pH to 7. An additional 2.3 g of concentrated HCl is then added to the reaction mixture. The concentrated HCl contains 38 wt percent hydrochloric acid. The reaction mixture is heated to 200°C for 2 hours. The reaction mass is extracted with ether, the ether extract dried, and after evaporating the ether a crude 1,3-dimethylnaphthalene is obtained in 93.5 percent yield. The crude product by VPC analysis is 83.5 percent 1,3-dimethylnaphthalene.

The above example indicates the feasibility of carrying out the complete process without isolation of the intermediate pentenal.

EXAMPLE 5

The procedure used in Example 4 is repeated with the exception that sulfuric acid is used instead of hydrochloric acid to carry out the ring closure reaction. Infrared analysis of the crude reaction product indicates that there is no significant amount of 1,3-dimethylnaphthalene formed.

EXAMPLE 6

As in Example 4, 20 g of hydratropaldehyde, 6.6 g of acetaldehyde and 5 g of sodium hydroxide are charged to a stirred autoclave containing 100 g of water. After heating at 98°C for two hours, the reaction mixture is cooled and 12.5 g of concentrated HCl is added to bring to a pH of about 6. After heating the reaction mixture at 200°C for 2 hours it is worked up as in Example 4. Analysis of the product shows that no $\alpha$-methylnaphthalene is present, but that the reaction has proceeded through condensation to produce a complex higher molecular weight product.

EXAMPLE 7

When Example 4 is repeated except that the hydratropaldehyde is replaced by an equivalent amount of 4-methylhydrotropaldehyde, the product 1,3,6-trimethylnaphthalene is isolated in good yield.

The invention claimed is:

1. A method for the preparation of 1,3-dimethyl substituted polycyclic aromatic compounds which comprises (1) subjecting a compound of structure

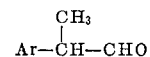

where Ar is an aromatic group, unsubstituted or substituted with an inert substituent and being free of any substituent in a position ortho to the

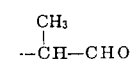

group, to a mixed aldol condensation with propionaldehyde to form a 4-Ar-2-methyl-2-pentenal, and (2) subjecting said pentenal to a halogen acid catalyzed ring closure.

2. The process of claim 1 where the aromatic aldehyde is hydratropaldehyde.

3. A process for making 1,3-dimethylnaphthalene which comprises reacting hydratropaldehyde with propionaldehyde under alkaline condensation conditions to form 4-phenyl-2-methyl-2-pentenal and ring closing said pentenal to said naphthalene product in the presence of a halogen acid.

4. The process of claim 3 where the halogen acid is hydrochloric acid.

5. The process of claim 1 where the aromatic aldehyde is 4-methyl-hydratropaldehyde.

* * * * *